United States Patent
Maas et al.

(10) Patent No.: US 12,553,531 B2
(45) Date of Patent: Feb. 17, 2026

(54) FLUID FLOW DEVICE, COMPRISING A FLOW CONTROL DEVICE WITH A SEALING PORTION PROVIDED WITH A NON-STICK LAYER HAVING ONE OR MORE DISCONTINUITIES

(71) Applicant: BERKIN B.V., Ruurlo (NL)

(72) Inventors: Hans Leon Margaretha Maria Maas, Ruurlo (NL); Jan Wouter Van De Geest, Ruurlo (NL)

(73) Assignee: BERKIN B.V., Ruurlo (NL)

( * ) Notice: Subject to any disclaimer, the term of this patent is extended or adjusted under 35 U.S.C. 154(b) by 0 days.

(21) Appl. No.: 18/699,237

(22) PCT Filed: Oct. 17, 2022

(86) PCT No.: PCT/NL2022/050590
§ 371 (c)(1),
(2) Date: Apr. 5, 2024

(87) PCT Pub. No.: WO2023/068926
PCT Pub. Date: Apr. 27, 2023

(65) Prior Publication Data
US 2024/0410486 A1   Dec. 12, 2024

(30) Foreign Application Priority Data
Oct. 18, 2021   (NL) ...................... 2029450

(51) Int. Cl.
*F16K 25/00*   (2006.01)
*F16K 1/36*   (2006.01)
*F16K 31/06*   (2006.01)

(52) U.S. Cl.
CPC .............. *F16K 25/005* (2013.01); *F16K 1/36* (2013.01); *F16K 31/0655* (2013.01)

(58) Field of Classification Search
CPC .......... F16K 25/005; F16K 25/00; F16K 1/36; F16K 31/0655; F04B 53/10–1035
See application file for complete search history.

(56) References Cited

U.S. PATENT DOCUMENTS 1,416,431 A * 5/1922 Wilson ...................... F16K 3/06
                                                  251/178
9,022,058 B2 * 5/2015 Beisel ...................... F16K 25/04
                                                  251/328

(Continued)

FOREIGN PATENT DOCUMENTS

DE    102007003213 A1    7/2008
EP    0500207 A2    8/1992

(Continued)

OTHER PUBLICATIONS

International Search Report received in PCT/NL2022/050590, mailed on Nov. 9, 2022, in 4 pages.

*Primary Examiner* — Marina A Tietjen
(74) *Attorney, Agent, or Firm* — Procopio, Cory, Hargreaves & Savitch LLP (57) ABSTRACT

The invention relates to a fluid flow device (1), comprising a fluid flow channel (2) with a flow control device (3) having a valve member (4) and a valve seat (5), wherein in a closed position (I) the valve member rests against the valve seat for preventing fluid flow and wherein in an open position the valve member is positioned away from the valve seat for allowing fluid flow, wherein the valve member or the valve seat comprises a sealing portion (6) for providing a reversible and leak-tight seal between the valve member and the valve seat in the closed position, wherein the sealing portion is provided with a non-stick layer (7) for preventing sticking of the sealing portion to the valve seat or the valve member (Continued)

in the closed position, wherein the non-stick layer comprises one or more discontinuities (8, 8*a*).

20 Claims, 4 Drawing Sheets

(56) References Cited

U.S. PATENT DOCUMENTS

| | | | |
|---|---|---|---|
| 9,115,814 B2 * | 8/2015 | Sun | F16K 3/246 |
| 12,297,922 B1 * | 5/2025 | Xu | F16K 25/005 |
| 2013/0020521 A1 | 1/2013 | Byrne | |
| 2014/0231694 A1 | 8/2014 | Okrent et al. | |
| 2019/0316685 A1 * | 10/2019 | Wang | F16K 15/063 |

FOREIGN PATENT DOCUMENTS

| | | | | |
|---|---|---|---|---|
| EP | 0500207 A3 | | 8/1992 | |
| JP | 2578034 Y2 | * | 8/1998 | |
| JP | 2007327614 A | * | 12/2007 | |
| JP | 2011027191 A | * | 2/2011 | |
| WO | WO-2013116634 A1 | * | 8/2013 | F04B 53/10 |
| WO | 2019/213622 A2 | | 11/2019 | |
| WO | 2019/213622 A3 | | 11/2019 | |
| WO | 2019/213622 A9 | | 11/2019 | |

* cited by examiner

FLUID FLOW DEVICE, COMPRISING A FLOW CONTROL DEVICE WITH A SEALING PORTION PROVIDED WITH A NON-STICK LAYER HAVING ONE OR MORE DISCONTINUITIES

CROSS-REFERENCE TO RELATED APPLICATIONS

This application is US National Stage of International Patent Application PCT/NL2022/050590, filed Oct. 17, 2022, which claims benefit of priority from NL 2029450, filed Oct. 18, 2021, the contents of both of which are incorporated herein by reference.

The invention relates to a fluid flow device, comprising a fluid flow channel with a flow control device having a valve member and a valve seat, wherein in a closed position the valve member rests against the valve seat for preventing fluid flow through the flow control device and wherein in an open position the valve member is positioned away from the valve seat for allowing fluid flow through the flow control device, wherein the valve member or the valve seat comprises a sealing portion for providing a reversible and leak-tight seal between the valve member and the valve seat in the closed position, wherein the sealing portion is provided with a non-stick layer for preventing sticking of the sealing portion to the valve seat or the valve member in the closed position.

Fluid flow devices often comprise a flow control device having a plunger, which is a common type of valve member, with a sealing portion made of a material that enables a seal between the valve, i.e. the plunger, and the valve seat, to prevent internal leakage of fluid. An example of such a material is an elastomer like rubber, though other materials having similar properties are also suitable, varying from other elastomers to suitable metals such as silver or indium.

WO 2019/213622 A2 for instance discloses a valve and seat set with a seal coupled to the valve body, the seal surface comprising irregularities to allow pressure to propagate in-between the mating surfaces when pressure from the inside of the valve is equal to, or greater than, pressure from the outside of the valve. This allows the seal to lift in response to minimal differential pressure in the intended flow direction (from inside the valve), while effectively sealing pressure in the reverse direction (from outside the valve). WO 2019/213622 A2, however, does not disclose a non-stick layer and does not disclose a leak-tight seal.

DE 10 2007 003213 A1 furthermore discloses a gas-injecting valve having a valve seat element with a passage opening, a valve seat support and an actuating element. The passage opening in the valve seat element is unlocked and locked. A circular sealing element is provided, which is arranged between the valve seat element and the valve seat support, at which the valve seat element is freely supported. The actuating element has an integral formed sealing area at its end, which is connected to the valve seat element and has a fixed separate sealing at the end of the actuating element.

US 2013/020521 A1 discloses a valve assembly having a valve member and a valve seat body. The valve member is reciprocatingly movable into and out of engagement with the valve seat body. The assembly further includes at least one deformable seal positioned to be at the situs of engagement of the valve member with the valve seat body.

US 2014/231694 A1 discloses a valve for controlling a medium, e.g., a gaseous medium, including a valve support having at least one passage aperture; a closing element which is configured to open and to close the at least one passage aperture; and a valve seat including at least one area projecting in the axial direction of the valve, the projecting area being coated with an elastomeric sealing element, and the elastomeric sealing element being exclusively situated on the projecting area of the valve seat.

EP 0500 207 A2 moreover discloses a fluid flow control valve having the closure part of either the valve body or the valve seat faced by thin metallic film backed by a resiliently deformable body.

A known problem with such fluid flow devices is that the plunger material (i.e. the material of the sealing portion) may have "sticky" properties and the sealing portion may thus stick or adhere to the valve or valve seat of the fluid flow device. This results in malfunctioning of the fluid flow device, leading to difficulties with controlling the fluid flow, for instance causing "overshoot" phenomena, wherein the sealing portion suddenly "breaks away" from the valve seat. The problem of the—for instance—rubber plunger sticking to the valve seat is solved by providing the plunger with a non-stick layer, such as a foil or coating or a treatment to make a surface "non-stick" (including chemical modification and plasma treatment), that covers the surface of the plunger that contacts the valve seat. This prevents the plunger from sticking to the valve seat, without having a significant impact on the sealing properties of the rubber plunger.

It is known that fluids, especially gasses such as $N_2$, $H_2$, $CO_2$, and $CH_4$, and gas mixes, diffuse through the rubber plunger material during use whenever there is a differential pressure. The diffusion occurs at high differential pressures (especially at 30 bar or higher). This diffusing of gas can give problems with plungers that comprise the non-stick layer as described above: the non-stick layer material (typically) has a significantly lower gas permeability than the plunger material. This lower gas permeability of the non-stick layer material can result in "entrapment" of high-pressure gas in the rubber plunger material, which is particularly troublesome when the gas pressure is (suddenly) lowered. The pressure difference between the gas trapped in the rubber plunger and the gas flowing through the channel then (suddenly) increases, which may severely damage the plunger (due to the high-pressure gas trapped in the plunger material essentially trying to "escape" or "break out" from the plunger material). This problem is known as "Rapid Gas Decompression" (RGD).

This effect is thus enhanced if the sealing portion, in this case the rubber plunger, is covered by the non-stick layer. Damage to the rubber plunger may be visible as bubbles between the rubber and the non-stick layer. This causes a bad seal between the valve member (in this case the plunger) and the valve seat, resulting in leakage of the fluid flow device. RGD can even result in rupture of the rubber plunger.

It is therefore an aim of the invention to provide a fluid flow device with a flow control device that is more RGD-resistant.

Thereto, the fluid flow device according to the invention is characterized in that the non-stick layer comprises one or more discontinuities of the layer for allowing degassing (or more generally speaking, "defluidization") of the sealing portion.

Thus, when the pressure is suddenly lowered, fluid seeking to "break out" from the plunger (i.e. the sealing portion) can more easily escape via the one or more discontinuities, thus for the most part resolving the issue of RGD.

In the context of the present application, "discontinuity" in a general sense means a discontinuity in the material of the non-stick layer, such as the creation of one or more through-openings in the non-stick layer, so that one or more small "flow channels" are formed between the sealing portion and the surrounding environment of the sealing portion, allowing fluid/gas to flow out of and "escape" from the sealing portion. The skilled person will understand that the discontinuity (or discontinuities) should not be so large that the leak-tight seal between the valve member and the valve seat in the closed position is compromised, and that the position of the discontinuity (or discontinuities) should also not compromise said seal.

The discontinuities of the layer are preferably perforations, lattices or concentric structures or other discontinuities of the layer that on the one hand allow fluid/gas to more easily escape from the sealing portion and on the other hand allow for creating the leak-tight seal for preventing fluid flow through the flow control device in the closed position. It is understood in the art that "leak-tightness" can be determined in a Helium tightness test. For example, a valve for a flow of 20-50 $l_n$/min is considered leak-tight if leakage is below $10^{-4}$ mbar*l/s, though even lower leakages are preferred. The flow control device would of course be in a closed position for such a leak test, as opposed to an open position which permits any level of flow above leakage.

Perforations are a particularly preferred embodiment. The perforation fully penetrates the layer. In addition, the perforation may extend into the sealing portion. The extension into the sealing layer may be about 1/10 of the thickness of the non-stick layer, or about 1/4 of the thickness of the non-stick layer, or about 1/2 of the thickness of the non-stick layer, or about two, three or four times the thickness of the non-stick layer, or even more. The size of the perforations depends on a.o. the expected operating temperature and pressure, size of the valve member, fluids etc., but they may be too small to be visible to the human eye.

In an embodiment of the fluid flow device, the valve seat comprises an orifice, wherein in the closed position the valve member rests against the orifice for preventing fluid flow through the orifice and wherein in the open position the valve member is positioned away from the valve seat for allowing fluid flow through the orifice, wherein the valve member comprises the sealing portion for positioning the valve member against the valve seat in the closed position, for providing the reversible and leak-tight seal. In practice, this embodiment allows for a particularly well-controllable flow through the fluid flow device, wherein the advantages provided by the discontinuities are well-observable, i.e. non-sticking of the sealing portion and rapid degassing thereof.

It is also possible that the valve seat instead of the valve member comprises the sealing portion. In such an embodiment, the valve member comprises an orifice, wherein in the closed position the valve member rests against the valve seat for preventing fluid flow through the orifice and wherein in the open position the valve member is positioned away from the valve seat for allowing fluid flow through the orifice, wherein the valve seat comprises the sealing portion for positioning the valve member against the orifice in the closed position, for providing the reversible and leak-tight seal.

The non-stick layer may cover at least 90%, preferably at least 95%, more preferably at least 97%, even more preferably at least 98%, even more preferably at least 99%, even more preferably at least 99.5%, most preferably at least 99.9%, such as 100%, of the sealing portion-contacting part of the valve seat. Covering said area almost completely has the benefit that it reduces the risk of the non-stick layer sticking to the valve seat ensuring smooth regulation of the flow when opening the flow control device.

The valve member may comprise or be a plunger. Such a plunger is relatively easy to actuate and control.

Preferably, the one or more discontinuities are configured for allowing defluidization of the sealing portion.

The sealing portion comprises or consists of an elastomer, a rubber or a rubber-like material.

The rubber or rubber-like material may comprise natural rubber polyisoprene, fluorine rubber, for instance FPM or FFPM (also known as FKM or FFKM), or ethylene propylene diene monomer (EPDM). Due to the optimal elastic properties of such materials, the risk of leakage of fluid through the flow control device when the flow control device is in the closed position is strongly reduced.

In an embodiment, the non-stick layer comprises a foil or a coating. Such a foil or coating is relatively easy to produce and relatively easy to attach to the sealing portion (e.g. by laminating). In case the fluid flow device is used for controlling the flow of a corrosive chemical fluid, it is preferred to use a chemical-resistant material for the non-stick layer to reduce the risk of leakage. The non-stick layer may thus comprise a material selected from the group consisting of polyimide, polyamide, or polytetrafluoroethylene (PTFE), as these materials have excellent chemical resistance. The skilled person understands that the thickness of the non-stick layer depends on many factors: the coverage, the fluid and the material of the sealing portion, the expected operating temperature and pressure, size of the valve member, etc. and will thus adjust layer thickness to achieve an optimal leak-tight seal.

In another embodiment, the non-stick layer is generated by modification, e.g. chemical modification of the sealing portion.

To improve the adhesion of the non-stick layer to the sealing portion, the non-stick layer may be laminated onto the sealing portion.

In an embodiment, the one or more discontinuities comprise at least 1 perforation, preferably at least 10 perforations, more preferably at least 50 perforations, even more preferably at least 100 perforations, most preferably at least 500 perforations. Depending on the type of material that the valve member or valve seat comprises, the amount of perforations in the non-stick layer can be "tuned" to the specific use of the fluid flow device and the fluid to be used therein to optimize "degassing" and minimize the risk of bubble formation between the sealing portion and the non-stick layer. If bubbles appear, this will irreversibly cause a bad seal between the valve member (such as the plunger) and the valve seat, resulting in leakage of the gas flow device.

In an embodiment, the one or more discontinuities have a shape that has rounded corners or no corners, such as a circle, an oval, an egg-shape or a quadrangle with rounded corners. Discontinuities having such a shape will minimize the risk of rupture of the non-stick layer.

The one or more discontinuities may be laid out in a geometric pattern in the non-stick layer, such as a triangular pattern, a quadrilateral pattern, a hexagonal pattern or a "random" pattern (i.e. a pattern with random groups of discontinuities, wherein at least some repetition is present).

The one or more discontinuities are preferably spaced at an approximately equal distance from each other. The one or more discontinuities may be spaced so that all points on the surface covered by the non-stick layer have a distance to a discontinuity below 200 μm, preferably below 100 μm, more preferably below 60 μm, even more preferably below 20 μm, yet even more preferably below 10 µm. Such patterns or distributions of the discontinuities in the non-stick layer will result in a more evenly distributed gas release through the non-stick layer thereby reducing the risk of damage to the sealing portion.

In an embodiment, the non-stick layer covers the sealing portion in such a manner that direct contact between the sealing portion and the valve seat or the valve member is prevented. By preventing direct contact between the sealing portion and the valve seat or valve member, the fluid flow device will operate smoother resulting in improved control of the fluid flow with the fluid flow device. It is thus conceivable that the non-stick layer only covers the sealing portion at those positions where the sealing portion would otherwise touch the valve member or valve seat, respectively.

In a preferred embodiment, the one or more discontinuities in the non-stick layer have a combined surface area that is at most 0.8% of a total surface area of the non-stick layer, which in practice provides an optimal balance between "stick-prevention" on the one hand and degassing on the other hand.

In a second aspect, the invention relates to a flow controller, comprising an aforementioned fluid flow device. The effects as disclosed above for the first aspect of the invention describing the fluid flow device can also be found in the flow controller, comprising said fluid flow device. The flow controller may comprise a mass flow meter, such as thermal meter, a Coriolis meter, an ultrasonic meter or a differential pressure meter.

In a third aspect, the invention relates to the use of an aforementioned fluid flow device for controlling a fluid flow. This fluid flow device may be normally closed or normally open.

In a fourth aspect, the invention relates to a method for producing an aforementioned fluid flow device, comprising the steps of:

applying the non-stick layer to the sealing portion; and
creating the one or more discontinuities in the non-stick layer after the non-stick layer has been attached to the sealing portion.

By first applying the non-stick layer to the sealing portion and then creating the one or more discontinuities the risk of "damaging" the discontinuities in the non-stick layer during the application of the non-stick layer to the sealing portion is minimized.

The one or more discontinuities in the non-stick layer may be created by means of ablation, such as laser ablation, laser drilling, water jetting, needle puncture, hot needle melting, etching, conventional drilling, punching or cutting. This will provide discontinuities having a shape that has rounded corners or no corners, such as a circle, an oval, an egg-shape or a quadrangle with rounded corners. The discontinuities having such a shape will minimize the risk of rupture of the non-stick layer.

Applying the non-stick layer to the sealing portion may comprise laminating the non-stick layer onto the sealing portion.

BRIEF DESCRIPTION OF THE DRAWINGS

The present invention is described by means of accompanying drawings wherein various embodiments of the invention are shown and wherein reference numerals represent the same or equivalent parts.

DETAILED DESCRIPTION

Figure 1:
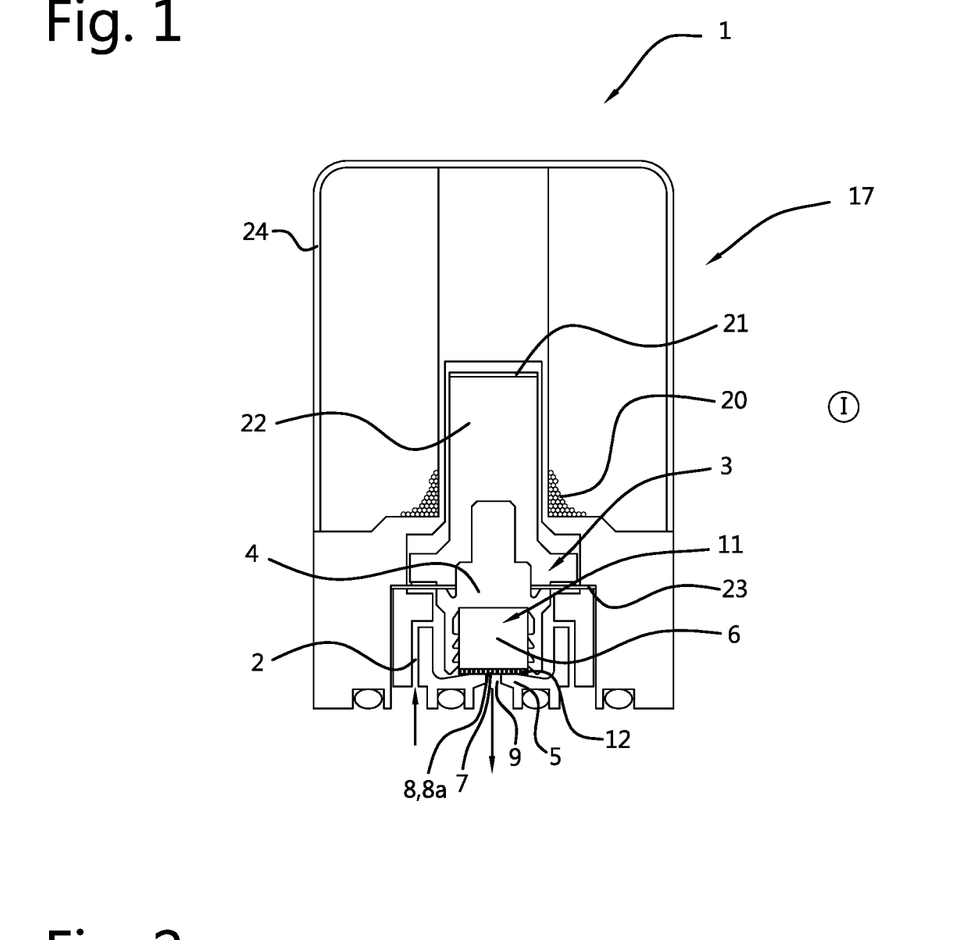
FIG. 1 shows a schematic view of a flow controller comprising a fluid flow device according to the invention having a flow control device, wherein the valve member comprises the sealing portion and the valve seat comprises the orifice.

FIG. 1 shows a cross-section of a flow controller 17 comprising a fluid flow device 1 with a fluid flow channel 2 and a flow control device 3. The fluid flow device 1 has a valve member 4 and a valve seat 5 that comprises an orifice 9. The valve seat 5 may have a conical or frustoconical shape as shown in FIG. 1 (much like a "volcano"), but other shapes can be chosen depending on, for example, the expected operating temperature and pressure. The valve member 4 comprises a plunger 11 with a sealing portion 6. The plunger 11 may have a cylindrical shape. The plunger 11 may furthermore be held by a plunger holder 22. Therein, it is conceivable that (in an actuation direction) the sealing portion 6 for the most part is enclosed by the plunger 11, such as 80-90% of the sealing portion 6. A small portion of the sealing portion 6 then protrudes from the plunger 11, such as 10-20% of the sealing portion 6. The sealing portion 6 may comprise or consist of an elastomer, a rubber or a rubber-like material. The rubber or rubber-like material may comprise natural rubber, polyisoprene, fluorine rubber, for instance FPM or FFPM, or EPDM. The sealing portion 6 is provided with a non-stick layer 7 that comprises one or more discontinuities 8, for instance in the form of perforations 8a, lattices or concentric structures (not shown). Other types of discontinuities may also be used, as long as on the one hand the required degassing is made possible and on the other hand a proper seal can be achieved. The sealing portion 6 and the non-stick layer 7 may both have a circular shape. The non-stick-layer 7 may comprise a foil or a coating 12. The non-stick layer 7 may comprise a material selected from the group consisting of polyimide, polyamide, or polytetrafluoroethylene (PTFE). The non-stick layer 7 is preferably laminated onto the sealing portion 6.

The fluid flow device 1 as shown in FIG. 1 is in a closed position (I), wherein the valve member 4 rests against the valve seat 5, thereby sealing off the orifice 9 in the valve seat 5 for preventing fluid flow through the flow control device 3. The valve member 4 may be actuated e.g. magnetically by a spool 20, for instance in combination with a top spring 21 provided a top end of the plunger holder 22 in combination with a linear spring 23. The spool 20 may be housed in a spool housing 24. The size/diameter of the spool 20 may vary, as shown in FIG. 1. In an open position, the flow of fluid through the fluid flow channel 2 may follow a flow path indicated by the arrows. Alternatively, other types of actuation may be used such as hydraulic, pneumatic, or electric including piezo-actuation.

Figure 2:
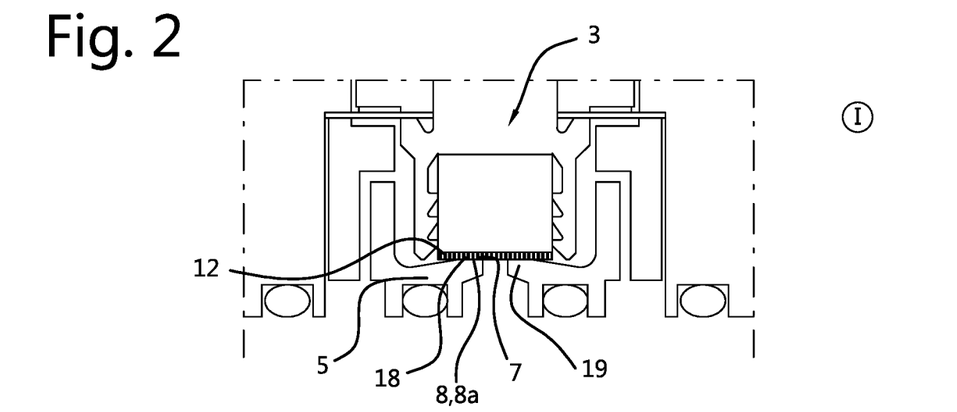
FIG. 2 shows a close-up view of the flow control device of FIG. 1, wherein the flow control device is in a closed position (I)

FIG. 2 shows a close-up view of the flow control device 3 of FIG. 1, wherein the fluid flow device 1 is in a closed position (I), wherein the valve member 4 rests against the valve seat 5 thereby sealing off the orifice 9 in the valve seat 5 for preventing fluid flow through the flow control device 3. A valve seat-contacting part of the sealing portion 6 is generally indicated with reference numeral 18. A sealing portion-contacting part of the valve seat 5 is indicated with reference numeral 19. Due to the shape of the valve seat 5, both the valve seat-contacting part 18 of the sealing portion 6 and the sealing portion-contacting part 19 of the valve seat 5 effectively create a relatively small ring-shaped contact surface around the orifice 9. In such an embodiment, it could be conceivable that the non-stick layer 7 itself also is approximately ring-shaped, and the surface of the sealing portion 6 comprising the non-stick layer 7 is approximately round.

Figure 3:
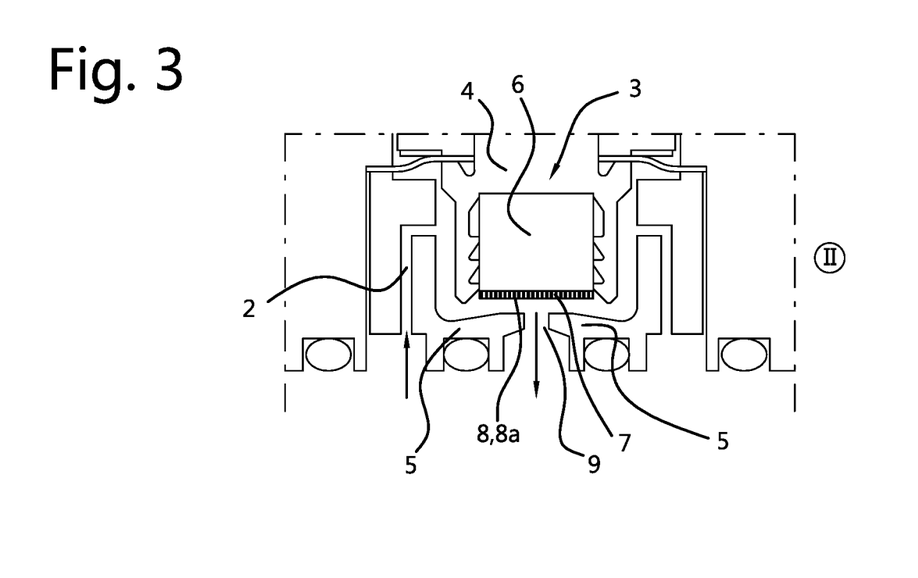
FIG. 3 shows another close-up view of the flow control device of FIG. 1, wherein the flow control device is in an open position (II)

FIG. 3 shows a close-up view of the flow control device 3, wherein the device is in an open position (II), wherein the valve member 4 is positioned away from the valve seat 5 thereby not sealing off the orifice 9 in the valve seat 5 for allowing fluid flow through the fluid flow channel 2 and the flow control device 3.

Figure 4:
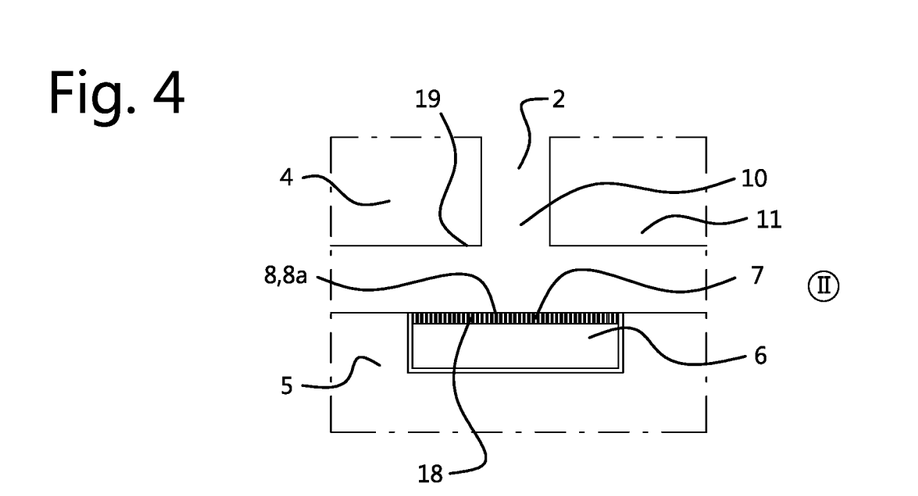
FIG. 4 shows a close-up view of another embodiment of a flow control device, wherein the valve seat comprises the sealing portion and the valve member comprises the orifice, wherein the flow control device is in an open position (II)

FIG. 4 shows a close-up view of an embodiment of the fluid flow device 1, wherein the valve seat 5 instead of the valve member 4 comprises the sealing portion 6. The valve member 4 comprises an orifice 9. In the closed position (I) (not shown) the valve member 4 again rests against the valve seat 5 for preventing fluid flow through the orifice 9. In the open position (II) (as shown in FIG. 4) the valve member 4 is positioned away from the valve seat 5 for allowing fluid flow through the orifice 9. The sealing portion 6 may be embedded in the valve seat 5, such as in a recess or cavity of the valve seat 5. The sealing portion 6 is typically round and may have an outer diameter of for instance 2-200 times a diameter of the orifice 9. Reference numeral 18 now indicates a valve member-contacting part of the sealing portion, whereas reference numeral 19 now indicates a sealing portion-contacting part of the valve member 4.

Figure 5:
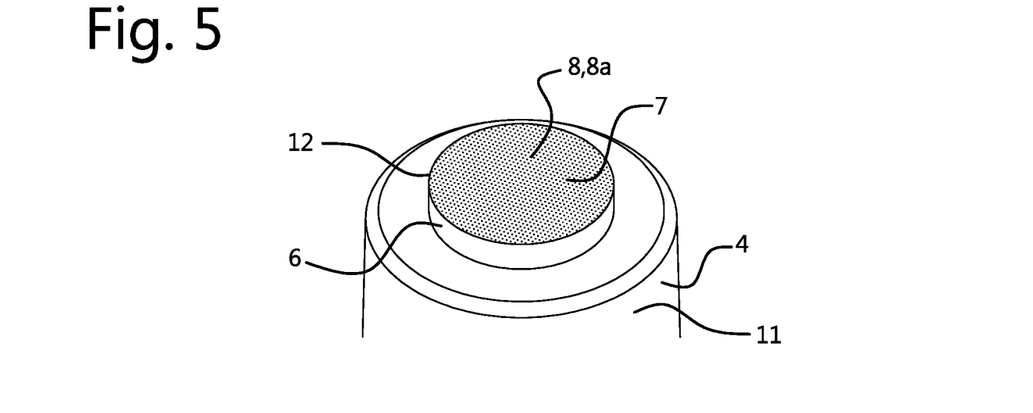
FIG. 5 shows a schematic, perspective view of an exemplary embodiment of a valve member comprising a plunger, wherein the plunger comprises the sealing portion.

FIG. 5 shows perspective view of a free end of a valve member 4 comprising a plunger 11. The free end of the plunger 11 comprises a sealing portion 6 that is provided with a non-stick layer 7 having one or more discontinuities 8, such as perforations 8a. The non-stick layer 7 comprises a foil or a coating 12.

Figure 6:
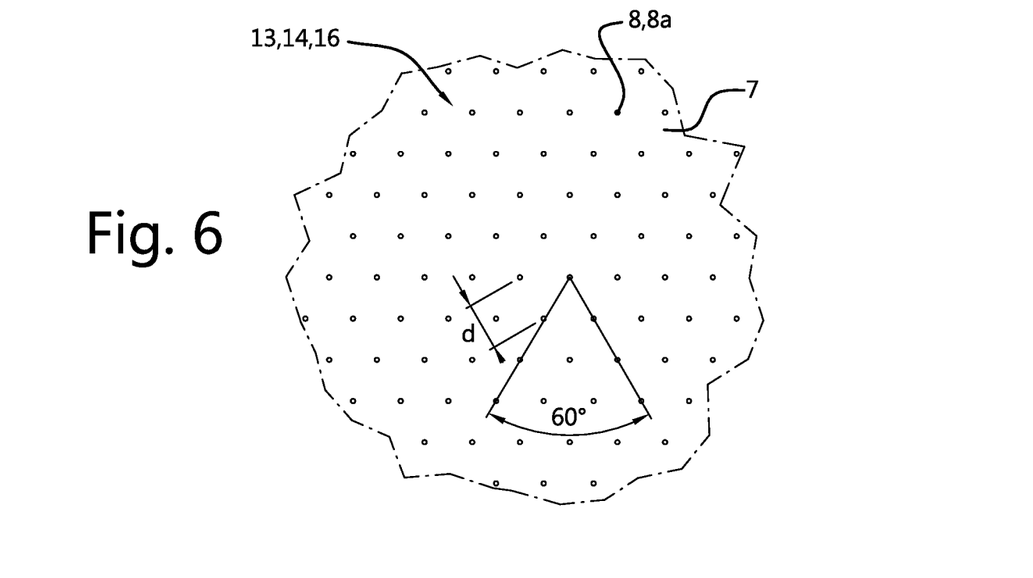
FIG. 6 shows a schematic, close-up view of an exemplary embodiment of the non-stick layer, showing discontinuities present as perforations, in a pattern.

FIG. 6 shows a close-up view of an exemplary embodiment of the non-stick layer 7 with discontinuities 8, 8a. The discontinuities 8, 8a are shown as perforations 8a which are laid out in a geometric pattern 13 in the non-stick layer 7, with rows of perforations 8a intersecting each other at an angle of 60°, although other angles may also be conceivable. The discontinuities 8, 8a are spaced at an approximately equal distance (d) from each other, wherein the discontinuities 8 are spaced so that all points on the surface covered by the non-stick layer 7 have a distance to a discontinuity below 200 μm, preferably below 100 μm, more preferably below 60 μm, even more preferably below 20 μm, yet even more preferably below 10 μm. The one or more discontinuities 8, 8a in the non-stick layer 7 may have a combined surface area that is at most 0.8% of a total surface area of the non-stick layer 7.

Figure 7A:
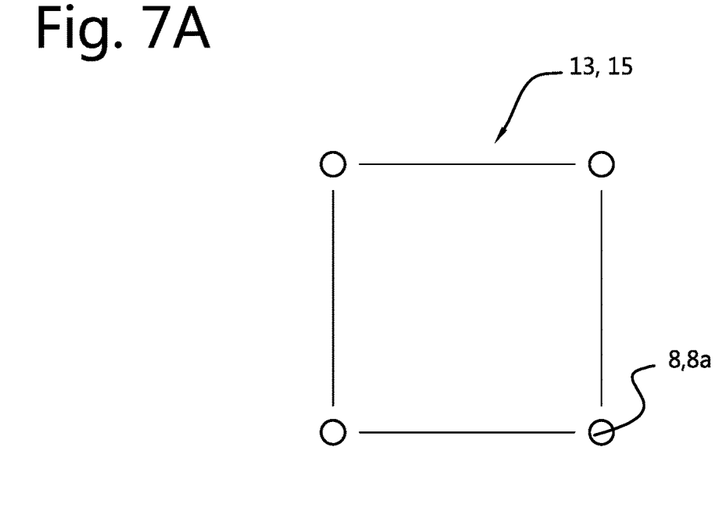
FIGS. 7A-7C show various possible geometric patterns of the perforations in the non-stick layer.
Figure 7B:
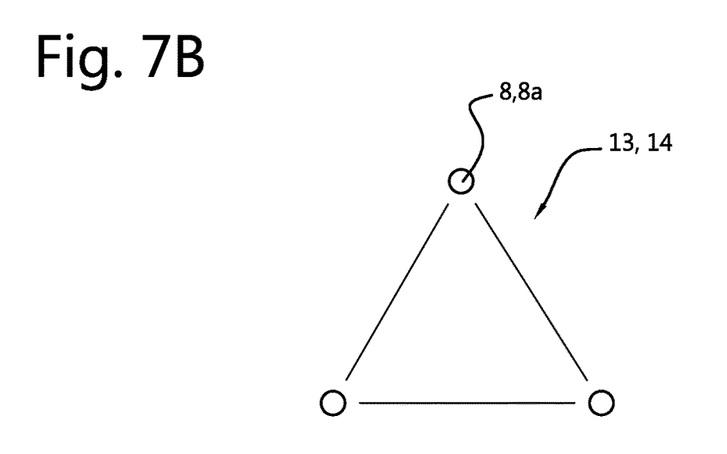
Figure 7C:
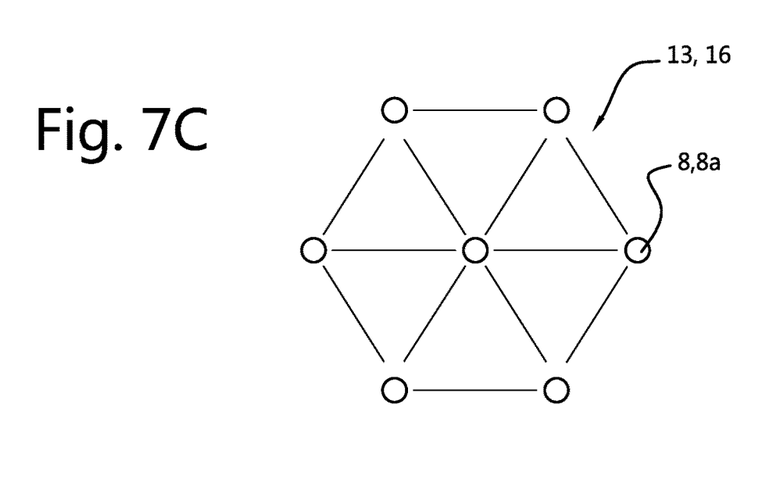

FIGS. 7A-7C show various possible geometric patterns 13 for the discontinuities 8, shown as perforations 8a, in the non-stick layer 7: FIG. 7A shows a quadrilateral pattern 15, FIG. 7B shows a triangular pattern 14 and FIG. 7C shows a hexagonal pattern 16.

A second aspect of the invention thus relates to a flow controller 17, as shown in FIG. 1, comprising an aforementioned fluid flow device 1.

A third aspect of the invention relates to the use of an aforementioned fluid flow device 1 for controlling a fluid flow.

A fourth aspect of the invention relates to a method for producing an aforementioned fluid flow device 1, comprising the steps of:
 applying the non-stick layer 7 to the sealing portion 6; and
 creating the one or more discontinuities 8, 8a in the non-stick layer 7 after the non-stick layer has been attached to the sealing portion 6.

The one or more discontinuities 8, 8a in the non-stick layer 7 may be created by means of ablation, such as laser ablation, laser drilling, water jetting, needle puncture, hot needle melting, etching, conventional drilling, punching or cutting. Preferably, the method used prevents the discontinuities 8 or perforations 8a from having any upstanding edges, which may hinder the creation of a proper seal. Applying the non-stick layer 7 to the sealing portion 6 may comprise laminating the non-stick layer 7 onto the sealing portion 6.

LIST OF REFERENCE NUMERALS

1. Fluid flow device
2. Fluid flow channel
3. Flow control device
4. Valve member
5. Valve seat
6. Sealing portion
7. Non-stick layer
8. Discontinuity of the layer
8a. Perforation
9. Orifice in valve seat
10. Orifice in valve member
11. Plunger
12. Foil or coating
13. Geometric pattern
14. Triangular pattern
15. Quadrilateral pattern
16. Hexagonal pattern
17. Flow controller
18. Valve seat/member-contacting part of the sealing portion
19. Sealing portion-contacting part of the valve seat/member
20. Spool
21. Top spring
22. Plunger holder
23. Linear spring
24. Spool housing
I. Closed position
II. Open position
d. Distance between perforations

The invention claimed is:
1. Fluid flow device, comprising:
 a fluid flow channel with a flow control device having a valve member and a valve seat,
 wherein, in a closed position, the valve member rests against the valve seat for preventing fluid flow through the flow control device, and in an open position, the valve member is positioned away from the valve seat for allowing fluid flow through the flow control device, wherein the valve member or the valve seat comprises a sealing portion for providing a reversible and leak-tight seal between the valve member and the valve seat in the closed position, wherein the sealing portion is provided with a non-stick layer for preventing sticking of the sealing portion to the valve seat or the valve member in the closed position, wherein the non-stick layer comprises one or more discontinuities, and wherein the one or more discontinuities are configured for allowing defluidization of the sealing portion.

2. Fluid flow device according to claim 1, wherein the one or more discontinuities of the non-stick layer are perforations, lattices or concentric structures.

3. Fluid flow device according to claim 1, wherein the valve seat comprises an orifice, wherein in the closed position the valve member rests against the orifice for preventing fluid flow through the orifice and wherein in the open position the valve member is positioned away from the valve seat for allowing fluid flow through the orifice, wherein the valve member comprises the sealing portion for positioning the valve member against the valve seat in the closed position, for providing the reversible and leak-tight seal.

4. Fluid flow device according to claim 2, wherein the non-stick layer covers at least 90% of a sealing portion-contacting part of the valve seat.

5. Fluid flow device according to claim 1, wherein the sealing portion comprises or consists of an elastomer or a rubber.

6. Fluid flow device according to claim 5, wherein the rubber comprises natural rubber, polyisoprene, fluorine rubber, or ethylene propylene diene monomer (EPDM).

7. Fluid flow device according to claim 1, wherein the non-stick layer comprises a foil or a coating.

8. Fluid flow device according to claim 1, wherein the non-stick layer comprises a material selected from the group consisting of polyimide, polyamide, or polytetrafluoroethylene (PTFE).

9. Fluid flow device according to claim 1, wherein the non-stick layer has been laminated onto the sealing portion.

10. Fluid flow device according to claim 2, wherein the one or more discontinuities have a shape that has rounded corners or no corners, including a circle, an oval, an egg-shape or a quadrangle with rounded corners.

11. Fluid flow device according to claim 1, wherein the one or more discontinuities are laid out in a geometric pattern in the non-stick layer, including a triangular pattern, a quadrilateral pattern, a hexagonal pattern or a random pattern.

12. Fluid flow device according to claim 1, wherein the one or more discontinuities are spaced at an approximately equal distance (d) from each other.

13. Fluid flow device according to claim 12, wherein the one or more discontinuities are spaced so that all points on a surface covered by the non-stick layer have a distance to a discontinuity below 200 µm.

14. Fluid flow device according to claim 1, wherein the one or more discontinuities in the non-stick layer have a combined surface area that is at most 0.8% of a total surface area of the non-stick layer.

15. Flow controller, comprising a fluid flow device according claim 1.

16. Use of the fluid flow device according to claim 1 for controlling a fluid flow.

17. Method for producing a fluid flow device according to claim 1, comprising:
applying the non-stick layer to the sealing portion; and
creating the one or more discontinuities in the non-stick layer after the non-stick layer has been attached to the sealing portion.

18. Method according to claim 17, wherein the one or more discontinuities in the non-stick layer are created by means of ablation, including laser ablation, laser drilling, water jetting, needle puncture, hot needle melting, conventional drilling, punching or cutting.

19. Method according to claim 17, wherein applying the non-stick layer to the sealing portion comprises laminating the non-stick layer onto the sealing portion.

20. Fluid flow device according to claim 1, wherein the one or more discontinuities comprises at least one through-hole opening in the non-stick layer, such that one or more flow channels are formed between the sealing portion and a surrounding environment of the sealing portion, allowing a fluid to flow out of and escape from the sealing portion, and
wherein the one or more discontinuities are configured for defluidization of a material of the sealing portion.

* * * * *